United States Patent [19]

Ditzer et al.

[11] Patent Number: 4,797,601
[45] Date of Patent: Jan. 10, 1989

[54] ABUTMENT FORCE ADJUSTABLE WINDSHIELD WIPER ARRANGEMENT

[75] Inventors: Erich Ditzer; Ludwig Hasenknopf, both of Munich, Fed. Rep. of Germany

[73] Assignee: Bayerische Motoren Werke AG, Munich, Fed. Rep. of Germany

[21] Appl. No.: 87,791

[22] Filed: Aug. 21, 1987

[30] Foreign Application Priority Data

Aug. 21, 1986 [DE] Fed. Rep. of Germany ....... 3628342

[51] Int. Cl.$^4$ ............................................. B60S 1/04
[52] U.S. Cl. .............................. 318/443; 318/DIG. 2; 15/250.01; 15/250.20
[58] Field of Search .................. 318/443, 444, DIG. 2; 15/250 C, 250.17, 250.20, 256.01, 250.02, 250.04, 250.28, 250.38

[56] References Cited

U.S. PATENT DOCUMENTS

| | | | |
|---|---|---|---|
| 3,058,141 | 10/1962 | Christen | 15/250.20 |
| 4,439,886 | 4/1984 | Yagasaki et al. | 15/250.20 |

FOREIGN PATENT DOCUMENTS

| | | | |
|---|---|---|---|
| 2314724 | 2/1975 | Fed. Rep. of Germany. | |
| 3148253 | 10/1983 | Fed. Rep. of Germany. | |
| 3600454 | 7/1986 | Fed. Rep. of Germany. | |
| 1286102 | 1/1962 | France | 15/250.20 |
| 55-160637 | 12/1980 | Japan | 15/250.20 |
| 56-60751 | 5/1981 | Japan | 15/250.20 |
| 61-64563 | 4/1986 | Japan | 15/250.20 |
| 0543696 | 3/1942 | United Kingdom | 15/250.01 |

*Primary Examiner*—Bentsu Ro
*Attorney, Agent, or Firm*—Barnes & Thornburg

[57] ABSTRACT

A wiper arrangement for motor vehicles with a wiper arm that rests on the surface to be cleaned with an abutment force dependent on the vehicle velocity; the wiper arm thereby rests on the surface to be cleaned during non-wiper operation with a decreased abutment force compared to wiper operation and during a washing operation with an increased abutment force compared to wiper operation.

3 Claims, 1 Drawing Sheet

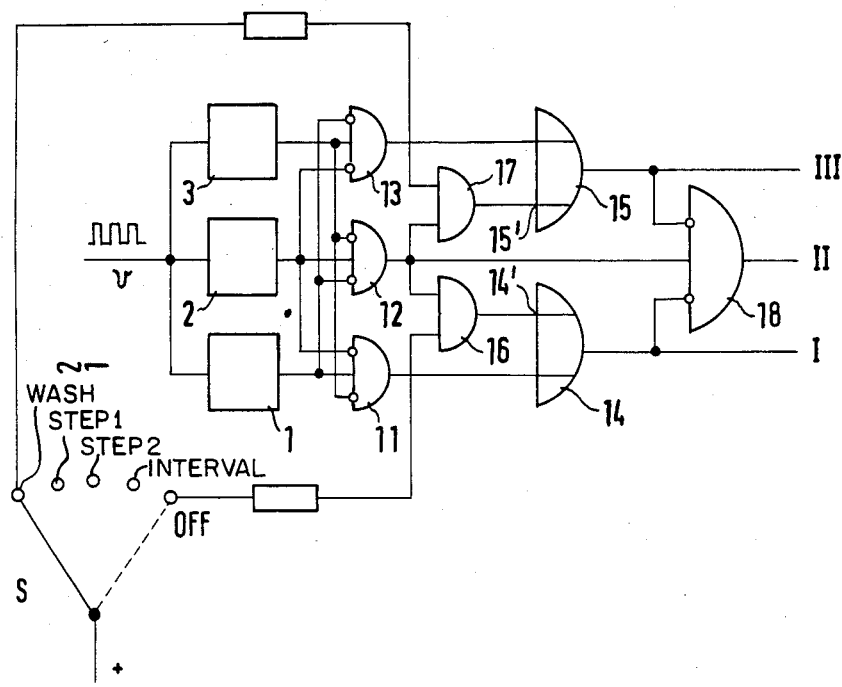

ABUTMENT FORCE ADJUSTABLE WINDSHIELD WIPER ARRANGEMENT

BACKGROUND AND SUMMARY OF THE INVENTION

The present invention relates to a windshield wiper arrangement for motor vehicles with a wiper arm that rests on the surface to be cleaned with a variable abutment force dependent on the vehicle velocity.

It is known in principle from the DE-PS No. 31 48 253 to adjust the abutment force dependent on the vehicle velocity. Furthermore, it is known from the DE-AS No. 23 14 724 to variably adjust the abutment force corresponding to the contour of the surface to be cleaned.

The present invention is concerned with an improvement of the windshield wiper arrangement disclosed in the DE-PS No. 31 48 253. In particular, the present invention keeps the wiper arm, already on the surface to be cleaned at the beginning of the operation, at a sufficient abutment pressure, to assure, with an additional washing operation a reliable cleaning of the surface. The underlying problems are solved according to the present invention in that the abutment force is increased compared to the standing-still motor vehicle and the abutment force during non-wiper operation is smaller than during wiper operation and/or in case of additional washing operation is larger than during wiper operation.

The present invention starts with the recognition that the adjustment of the abutment force requires a certain time. If increasing the abutment force to the necessary value are initiated at the beginning of the wiper operation, then this leads to a wiper operation with insufficient abutment pressure during the first wiping cycle and during slower build-up of the abutment force during a few wiping cycles. Since the wiping operation is engaged, as a rule, only when urgently needed, this leads, in particular at high vehicle velocities, to an unsafe situation. Thus, only after an excessively long period of time a considerable distance, can reckon with a sufficient cleaning action is achieved.

The same is true during the engagement of the washing operation in addition to the wiper operation. By the application of an increased liquid quantity, it is necessary to provide a sufficiently large abutment force because only in that case is an adequate cleaning action assured. Since the build-up of the abutment force is slow, the abutment force is not adequate during the starting phase of the wiper/washing operation. The consequences are equally critical as in the previously described case at the beginning of the pure wiper operation.

It is achieved by the present invention that at the beginning of the wiper operation and/or of the additional washing operation, the abutment force has the requisite abutment magnitude. Thus during the first wiping cycle, an adequate cleaning action is assured. The traffic safety is considerably increased thereby.

Further features of the present invention are directed to the adjustment of the abutment force in two or three steps. In the two step case, the transition between the steps takes place during wiper operation as a function of velocity. During non-wiper operation, the low base step as regards abutment force is always engaged. With additional operation, the higher maximum step as regards abutment force is always engaged.

For the adjustment of the abutment force in three steps, the adjustment of the abutment force during wiper operation is undertaken dependent on the velocity and includes a middle step which, compared to the base step, has a greater abutment force and compared to the maximum step, a lower abutment force. The base step is engaged during non-wiper operation also at a vehicle velocity, at which during wiper operation the middle or the maximum step is engaged. During washer operation, the middle and/or the maximum step is engaged at a vehicle velocity at which, during wiper operation, the base and/or middle step respectively is engaged.

It is common to both further features that the adjustment of the abutment force takes place in steps which are dependent on the vehicle velocity. During non-wiper operation, the engaged step, insofar as this is possible, is reduced with respect to the wiper operation by one, respectively, possibly also by the two steps in the case of three steps. During washing operation, the adjustment of the abutment force is increased inversely by one, respectively, by two steps compared to the pure wiper operation. A possibly necessary increase of the abutment force takes place then as a rule only by one step. The time necessary therefor is noticeably reduced compared to the adjustment of the abutment force to the required strength only in the case of need and starting from the level with standing motor vehicle.

BRIEF DESCRIPTION OF THE DRAWING

These and other objects, features and advantages of the present invention will become more apparent from the following description when taken in connection with the accompanying drawing which shows, for purposes of illustration only, one embodiment in accordance with the present invention, and wherein:

The single FIGURE is a schematic block diagram of one embodiment of a circuit arrangement for a windshield wiper system in accordance with the present invention.

DETAILED DESCRIPTION OF THE DRAWING

Referring now to the single FIGURE of the drawing, the schematically illustrated circuit arrangement for a windshield wiper system of motor vehicles serves to activate an adjusting member (not shown) for a wiper arm (also not shown) in three steps for a base position I, a middle position II, and a maximum position III representing three abutment pressures. The abutment force of the wiper arm is increase from the base position I corresponding to the abutment force of a starting position. The wiper arm possesses, as regards its abutment force, this starting position when the vehicle stands still. In the position II of the adjusting member, the abutment force is greater than in the base position I. In the adjusted position III, this abutment force is greater than in the middle position II.

The transition between the three steps for the abutment force and therewith between the adjustments I, II and III of the adjusting member is to take place during the wiper operation of the wiper arm dependent on the vehicle velocity. For that purpose, the output signal v of the velocity pick-up or transmitter (not shown) is conducted to three integrators 1, 2 and 3 having window threshold circuits (not shown) connected in the outputs thereof. The outputs of the threshold circuits are connected with AND elements 11, 12 and 13 in the illustrated manner. By inverting respectively two of the three inputs of the AND elements 11 to 13, the vehicle velocity is subdivided into three ranges and in each of these ranges one of the AND elements 11 to 13 has an output condition which differs from that of the other AND elements. For example, the threshold circuits connected in the output of the integrators 1 to 3 are to respond, respectively, at velocities of 5, 130 and 180 km/h. Then for the velocities between 5 and 130 km/h, the input of the AND element 11 from the integrator 1 is from a voltage point of view different from the corresponding input of integrator 1 to the AND elements 12 and 13. Analogously, the same is true for the input of the AND element 12 for velocities between 130 and 180 km/h and the input of the AND element 13 for velocities above 180 km/h.

If the outputs of the AND elements 11 to 13 are utilized directly for the control of the adjusting member, then an adjustment of the adjusting member would result in the three steps I to III corresponding to the three steps for the abutment forces exclusively in dependence on the vehicle velocity. The transition between the individual steps would take place at 130 and 180 km/h.

The possibility according to the present invention will be indicated to increase additionally the velocity-dependent adjusted step during washing operation compared to the wiper operation and to lower the velocity-dependent adjustment step during non-wiper operation compared to the wiper operation. For the sake of simplicity, this is illustrated only for the adjustment II. OR elements 14 and 15 are connected to the output of the AND elements 11 and 13, respectively. The OR elements 14 and 15 are connected at their second inputs 14' and 15' with the outputs of AND elements 16 and 17. The AND elements 16 and 17 are connected to the output of the AND element 12 and to a washer/wiper switch S. During non-wiper operation, switch S in the off position activates the input of the AND element 16 and during washing operation it activates the input of the AND element 17. The outputs of the OR elements 14 and 15 are utilized directly for the control of the adjusting member for the steps I and III and are both inverted and together with the output of the AND element 12 are connected to the inputs of a further AND element 18 whose output serves for the control of the adjusting member for the step II.

During (pure) wiper operation when positions "Interval", step 1 and step 2 of switch S are selected, the AND element 18 is activated at a vehicle velocity between 130 and 180 km/h because the OR elements 14 and 15 are not activated at their outputs and AND element 12 is activated. As a result of the adjustment member is adjusted to step II.

If in the indicated velocity range of AND element 12 additionally the washing operation is engaged by switch S, then the AND element 17 becomes conductive and activates the output of the OR element 15. As a result thereof, the adjusting member is adjusted to the step III. At the same time, the AND element 18 is de-activated in its output condition by the activated OR element 15, and the adjustment II of the adjusting member is turned-off or disengaged.

The following takes place in the indicated velocity range of AND element 12 when the wiper operation is turned off by switch S. In this case, the AND element 16 activates the OR element 14 and leads to an adjustment of the adjusting member for the abutment force to the position I. At the same time the AND element 18 is deactivated in its output and the position II is disengaged. Thus, the abutment force is increased during the engagement of the washing operation and decreased during non-wiper operation compared to the wiper operation in the considered velocity range of 130 to 180 km/h.

Analogously for the velocity range below 130 km/h, in lieu the position I, the position II is adjusted by a corresponding circuitry during washing operation. Also, at velocities above 180 km/h, in lieu of the adjustment position III, the position II is adjusted for non-wiper operation. An adaptation of the abutment force to the actual requirements is achieved thereby and the fact is taken into consideration that the application of the abutment force does not take place instantaneously at the beginning of the wiper operation, respectively, of the washing operation by reason of constructive conditions. The superposition of the illustrated adjustment of the abutment force in several steps by a variation of the abutment force dependent on the position of the wiper arm on the surface to be cleaned is not illustrated but in principle is quite possible. The illustrated adjustment of the abutment force in steps is then the starting point for the further positional-dependent variation of the abutment force.

While we have shown and described only one embodiment in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. A windshield wiper arrangement for motor vehicles comprising:

a wiper arm resting on a surface to be cleaned with a variable abutment force dependent on vehicle velocity; and control means for increasing the abutment force compared to the abutment force in effect with a standing-still motor vehicle and for rendering the abutment force smaller during non-wiper operation than during wiper operation and for rendering the abutment force larger during an additional washing operation than during the wiper operation;

said control means increases the abutment force in two steps, the transition between the steps taking place during wiper operation as a function of the velocity, while during non-wiper operation always a lower base step of abutment force is engaged and during an additional washing operation always a higher maximum step of the abutment force is engaged.

2. A windshield wiper arrangement according to claim 1, wherein the adjustment of the abutment force during windshield wiper operation is additionally undertaken by the control means as a function of velocity in a middle step which compared to the base step has a greater abutment force and compared to the maximum step, a lower abutment force; the base step being also engaged during non-wiper operation at a vehicle velocity at which during wiper operation either the middle or the maximum step is engaged; and during washing operation, the maximum step is engaged at a vehicle velocity at which during the wiper operation either the middle step or the maximum step is engaged.

3. A windshield wiper arrangement for motor vehicles comprising:
   a wiper arm resting on a surface to be cleaned; and
   control means for varying abutment force of said wiper arm dependent upon vehicle velocity and independent of wiper operation mode, and for rendering the abutment force smaller during non-wiper operation mode, and for rendering the abutment force smaller during non-wiper operation than during wiper operation for a given velocity, and for rendering the abutment force larger during an additional washing operation than during the wiper operation for a given vehicle velocity;
   said control means increases the abutment force in two steps; the transistion between the steps taking place during wiper operation as a function of velocity, while during non-wiper operation always a lower base step of the abutment force is engaged and during an additional washing operation always a higher maximum step of abutment force is engaged.

* * * * *